(12) United States Patent
Zhu et al.

(10) Patent No.: US 7,345,895 B2
(45) Date of Patent: ***Mar. 18, 2008

(54) ADAPTIVE MULTI-LEVEL THRESHOLD SYSTEM AND METHOD FOR POWER CONVERTER PROTECTION

(75) Inventors: Zhen Zhu, Shanghai (CN); Jun Ye, Shanghai (CN); Shifeng Zhao, Shanghai (CN); Lieyi Fang, Shanghai (CN); Zhiliang Chen, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 11/449,142

(22) Filed: Jun. 7, 2006

(65) Prior Publication Data

US 2006/0291258 A1    Dec. 28, 2006

Related U.S. Application Data

(63) Continuation of application No. 11/051,242, filed on Feb. 4, 2005, now Pat. No. 7,099,164.

(30) Foreign Application Priority Data

Feb. 3, 2005    (CN) .......................... 2005 1 0023920

(51) Int. Cl.
*H02M 3/335* (2006.01)
(52) U.S. Cl. .................. 363/21.12; 363/41; 363/21.17
(58) Field of Classification Search .................. 363/41, 363/21.12, 21.17, 21.18, 21.16

See application file for complete search history.

(56) References Cited

U.S. PATENT DOCUMENTS

| 6,714,425 | B2 * | 3/2004 | Yamada et al. | ........... 363/21.12 |
| 6,853,174 | B1 * | 2/2005 | Inn | ............................. 323/285 |
| 6,914,789 | B2 * | 7/2005 | Kinoshita et al. | ......... 363/21.12 |
| 6,940,733 | B2 * | 9/2005 | Schie et al. | ............... 363/21.12 |
| 6,947,298 | B2 * | 9/2005 | Uchida | ..................... 363/21.17 |
| 7,027,313 | B2 * | 4/2006 | Amei | ....................... 363/21.12 |

* cited by examiner

*Primary Examiner*—Bao Q. Vu
(74) *Attorney, Agent, or Firm*—Townsend and Townsend and Crew LLP

(57) ABSTRACT

System and method for protecting a power converter. The system includes a compensation system configured to receive an input signal and generate a control signal, a cycle threshold generator configured to receive the control signal and generate a cycle threshold, and a comparator configured to receive the cycle threshold and a feedback signal and generate a comparison signal. Additionally, the system includes a pulse-width-modulation generator configured to receive the comparison signal and generate a modulation signal in response to the comparison signal, and a switch configured to receive the modulation signal and control an input current for a power converter. The input current is associated with an output power for the power converter. The cycle threshold corresponds to a threshold power level for the output power. The threshold power level is constant, decreases, or increases with respect to the input signal.

21 Claims, 5 Drawing Sheets

ADAPTIVE MULTI-LEVEL THRESHOLD SYSTEM AND METHOD FOR POWER CONVERTER PROTECTION

CROSS-REFERENCES TO RELATED APPLICATIONS

This application is a continuation of U.S. patent application No. 11/051,242, filed Feb. 4, 2005, which claims priority to Chinese Patent Application No. 200510023920.6, filed Feb. 3, 2005, entitled "Adaptive Multi-L evel Threshold System and Method for Power Converter Protection," by Inventors Zhen Zhu, Jun Ye, Shifeng Zhao, Lieyi Fang, and Zhiliang Chen. Both applications are commonly assigned, and incorporated by reference herein for all purposes.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK

Not applicable

BACKGROUND OF THE INVENTION

The present invention is directed to integrated circuits. More particularly, the invention provides an adaptive multi-level threshold system and method for over-current protection. Merely by way of example, the invention has been applied to a power converter. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

The power converters include linear converters and switch-mode converters. The switch-mode converters often use pulse-width-modulated (PWM) or pulse-frequency-modulated mechanisms. These mechanisms are usually implemented with a switch-mode controller including various protection components. These components can provide over-voltage protection, over-temperature protection, and over-current protection (OCP). These protections can often prevent the power converters from suffering permanent damage.

For example, a conventional OCP uses a single threshold level, which can limit the current on a cycle-by-cycle or pulse-by-pulse basis. But this conventional technique usually cannot adequate protect the power converters under certain operating conditions.

Hence it is highly desirable to improve techniques for over-current protection.

BRIEF SUMMARY OF THE INVENTION

The present invention is directed to integrated circuits. More particularly, the invention provides an adaptive multi-level threshold system and method for over-current protection. Merely by way of example, the invention has been applied to a power converter. But it would be recognized that the invention has a much broader range of applicability.

According to one embodiment of the present invention, a system for protecting a power converter is provided. The system includes a compensation system configured to receive an input signal and generate a control signal, a cycle threshold generator configured to receive the control signal and generate a cycle threshold, and a comparator configured to receive the cycle threshold and a feedback signal and generate a comparison signal. Additionally, the system includes a pulse-width-modulation generator configured to receive the comparison signal and generate a modulation signal in response to the comparison signal, and a switch configured to receive the modulation signal and control an input current for a power converter. The input current is associated with an output power for the power converter. The cycle threshold corresponds to a threshold power level for the output power. The threshold power level is constant, decreases, or increases with respect to the input signal.

According to another embodiment of the present invention, a system for protecting a power converter includes a startup control system configured to generate a first control signal, a cycle threshold generator configured to receive the first control signal and generate a cycle threshold, and a comparator configured to receive the cycle threshold and a feedback signal and generate a comparison signal. Additionally, the system includes a pulse-width-modulation generator configured to receive the comparison signal and generate a modulation signal in response to the comparison signal, and a switch configured to receive the modulation signal and control an input current for a power converter. The cycle threshold increases with a time during a startup period.

According to yet another embodiment of the present invention, a system for protecting a power converter includes a cycle threshold generator configured to generate a cycle threshold, a comparator configured to receive the cycle threshold and a feedback signal and generate a comparison signal, and a pulse-width-modulation generator configured to receive the comparison signal and generate a modulation signal in response to the comparison signal. Additionally, the system includes a switch configured to receive the modulation signal and control an input current for a power converter, and a pattern recognition system configured to receive the comparison signal and output a first control signal to the cycle threshold generator. The first control signal indicates whether the feedback signal exceeds the cycle threshold at a frequency higher than a predetermined level. The cycle threshold generator is further configured to reduce the cycle threshold from a first threshold level to a second threshold level if the first control signal indicates the feedback signal exceeds the cycle threshold at the frequency higher than the predetermined level.

According yet another embodiment of the present invention, a system for protecting a power converter includes a compensation system configured to receive an input signal and generate a control signal, a threshold generator configured to receive the control signal and generate a threshold, and a comparator configured to receive the threshold and a feedback signal and generate a comparison signal. Additionally, the system includes a shutdown control system configured to receive the comparison signal and generate a shutdown signal, and a switch coupled to the shutdown control system and configured to shut down a power converter. The threshold varies with at least the input signal.

According to yet another embodiment of the present invention, a method for protecting a power converter includes receiving an input signal, generating a first control signal based on at least information associated with the input signal, and generating a second control signal indicating whether a power converter is at a startup state. Additionally, the method includes processing information associated with the first control signal, the second control signal, and a third control signal, generating a cycle threshold based on at least information associated with the first control signal, the second control signal, and the third control signal, and processing information associated with the cycle threshold and a feedback signal. Moreover, the method includes generating a comparison signal based on at least information associated with the cycle threshold and the feedback signal, processing information associated with the comparison signal, and generating the third control signal based on at least information associated with the comparison signal. The third control signal indicates whether the feedback signal exceeds the cycle threshold at a frequency higher than a predetermined level. Also, the method includes generating a modulation signal based on at least information associated with the comparison signal, and determining an input current for the power converter based on at least information associated with the modulation signal.

According to yet another embodiment of the present invention, a method for protecting a power converter includes receiving an input signal, generating a control signal based on at least information associated with the input signal, and processing information associated with the control signal. Additionally, the method includes generating a threshold based on at least information associated with the control signal, processing information associated with the threshold and a feedback signal, and generating a comparison signal based on at least information associated with the threshold and the feedback signal. Moreover, the method includes processing information associated with the comparison signal, and shutting down the power converter based on at least information associated with the comparison signal. The threshold varies with at least the input signal.

Many benefits are achieved by way of the present invention over conventional techniques. For example, some embodiments of the present invention provide multi-level thresholds for over-current protection. For example, the multi-level thresholds correspond to different operating conditions. As an example, the operating conditions include output overloading conditions and system startup conditions. In another example, the multi-level thresholds are adaptively adjusted based on input voltage. In yet another example, the multi-level thresholds are in the current domain and/or the voltage domain. Certain embodiments of the present invention provide a cycle-by-cycle threshold that is compensated for variations in input voltage. For example, the maximum output power is adjusted in response to variations in the input voltage. Some embodiments of the present invention provide a cycle-by-cycle threshold for current limiting under normal operations. For example, the maximum output power is set to be constant, increasing or decreasing over a range of input voltage under normal operations depending on the compensation scheme used between over-current threshold level and input voltage.

Certain embodiments of the present invention adjust a cycle-by-cycle threshold in response to a triggering pattern of an over-current protection. The triggering pattern reflects the output loading conditions. For example, if the triggering count is low and random within a given period of time, the output loading condition is usually normal. The cycle-by-cycle threshold for normal operations can be used. In another example, if the triggering count exceeds a predetermined level within a given period of time, the cycle-by-cycle threshold is reduced. In yet another example, the maximum output power is reduced under short-circuit or heavy-overloading conditions until the output loading condition becomes normal. In yet another example, the power converter operates in CCM or DCM. Some embodiments of the present invention adjust a cycle-by-cycle threshold to control the current increase during system startup. For example, during the startup, the cycle-by-cycle threshold is ramped from a low value to the normal value used for normal operations. Certain embodiments of the present invention distinguish the over-current protection for start-up conditions and the over-current protection for normal operations. During the power supply startup, the output voltage of a power converter is usually lower than the output voltage for normal operations. The feedback loop can force the power converter to deliver additional current and thus power to the output. Consequently, the transformer winding current can quickly rise to a very high level. This rapid current rise often causes transient saturation of the winding and damages the converter system due to double magnetic flux effect. According to certain embodiments of the present invention, the over-current threshold is ramped up during start up in order to avoid or reduce the transient saturation and double magnetic flux effect. Hence the system damage can be reduced or prevented.

Certain embodiments of the present invention provide an abnormal threshold. For example, the abnormal threshold is higher than, equal to, or lower than the cycle-by-cycle threshold. In another example, the abnormal threshold is used for triggering a system shutdown in short-circuit and/or over-loading conditions. Some embodiments of the present invention provide a self recovery mechanism after a predetermined shutdown period. For example, a power converter can operate in the "burst mode" to reduce the output power under abnormally high over-current conditions and recover to normal operations once the abnormally high over-current conditions are cleared. Certain embodiments of the present invention provide an immediate and permanent latch shutdown if the highest over-current threshold is triggered in order to effectively protect the converter system from damage in a timely manner. Some embodiments of the present invention provide a solution for both current limiting and system shutdown. Certain embodiments of the present invention can shorten the OCP de-bouncing and/or delay and overcome the over-current hole problem. Some embodiments of the present invention can improve system flexibility, reliability and safety. Certain embodiments of the present invention can decouple a complicated OCP design into a simple set of protection mechanisms.

Various additional objects, features and advantages of the present invention can be more fully appreciated with reference to the detailed description and the accompanying drawings that follow.

DETAILED DESCRIPTION OF THE INVENTION

The present invention is directed to integrated circuits. More particularly, the invention provides an adaptive multi-level threshold system and method for over-current protection. Merely by way of example, the invention has been applied to a power converter. But it would be recognized that the invention has a much broader range of applicability.

The conventional over-current protection (OCP) often fails to limit the current or protect the power converter under various conditions. For example, the power converter is operated in continuous current mode (CCM). If the output is overloaded or short circuited. The current can start off at a value higher than the OCP threshold and thus overstress the power converter. Also, if the power converter experiences inductor saturation for transformer windings, the OCP control can be delayed for such a long period of time that the current may fly off and permanently damage the power converter. As another example, the power converter is operated at low duty cycle. The "on" period is shorter than the OCP control delay, so the OCP fails to respond to the over-current condition. In yet another example, the over-current protection is frequently triggered by certain operating conditions. These conditions can apply continuous stress to the power converter, and degrade its long-term reliability. Also, the power converter may fail to meet certain safety requirements because of high power delivered under these operating conditions.

Figure 1:
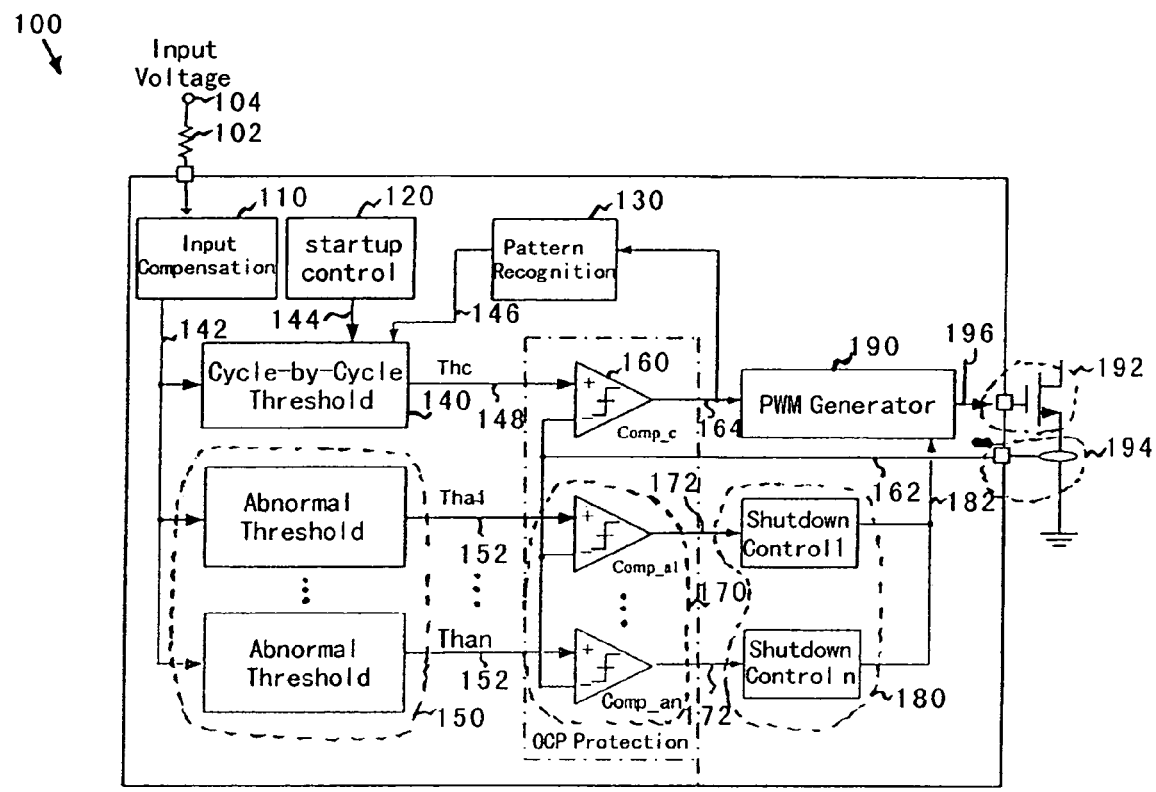
FIG. 1 is a simplified adaptive multi-level threshold system for over-current protection according to an embodiment of the present invention.

FIG. 1 is a simplified adaptive multi-level threshold system for over-current protection according to an embodiment of the present invention. This diagram is merely an example, which should not unduly limit the scope of the claims. One of ordinary skill in the art would recognize many variations, alternatives, and modifications. A system 100 includes a resistor 102, an input compensation system 110, a startup control system 120, a pattern recognition system 130, a cycle-by-cycle threshold generator 140, an abnormal threshold generator 150, a cycle-by-cycle comparator 160, an abnormal comparator 170, a shutdown control system 180, a pulse-width-modulation (PWM) generator 190, a switch 192, and a feedback system 194. Although the above has been shown using a selected group of components for the system 100, there can be many alternatives, modifications, and variations. For example, some of the components may be expanded and/or combined. Other components may be inserted to those noted above. Depending upon the embodiment, the arrangement of components may be interchanged with others replaced. For example, the system 100 is used to regulate a power converter. Further details of these components are found throughout the present specification and more particularly below.

The cycle-by-cycle threshold generator 140 receives control signals 142, 144, and 146 from the input compensation system 110, the startup control system 120, and the pattern recognition system 130 respectively, and outputs a cycle-by-cycle threshold signal 148. For example, the cycle-by-cycle threshold signal 148 is used to limit the peak current of the power converter. The abnormal threshold generator 150 receives the control signal 142 from the input compensation system 110 and outputs an abnormal threshold signal 152. In one embodiment, the abnormal threshold generator 150 includes n abnormal threshold subsystems, and the abnormal threshold signal 152 includes values of n abnormal thresholds. n is a positive integer.

The cycle-by-cycle threshold signal 148 represents either a cycle-by-cycle threshold voltage or a cycle-by-cycle threshold current. The abnormal threshold signal 152 represents either an abnormal threshold voltage or an abnormal threshold current. In one embodiment, the cycle-by-cycle threshold voltage is lower than, equal to, or higher than the abnormal threshold voltage. In another embodiment, the cycle-by-cycle threshold current is lower than, equal to, or higher than the abnormal threshold current.

The control signal 142 is generated by the input compensation system 110. The input compensation system 110 is connected to the resistor 102, which is also coupled to an input voltage 104. In one embodiment, the input compensation system 110 senses the input voltage 104 and generates the control signal 142. For example, the input compensation system 110 receives an input signal, which is proportional to the input voltage.

The control signals 142, 144, and 146 are used by the cycle-by-cycle threshold generator 140 to determine the cycle-by-cycle threshold signal 148. For example, the control signals 142 can adjust the cycle-by-cycle threshold signal 148 in order to compensate for variations in the input voltage 104 during normal operations. In another example, during the startup of a power converter, the control signal 144 is used to reduce the cycle-by-cycle threshold signal 148 from the value used for normal operations, and then gradually raise the cycle-by-cycle threshold signal 148 to the value for normal operations. In one embodiment, the cycle-by-cycle threshold varies with the time and the input voltage 104 during the startup period. In yet another example, the control signal 146 can be used to lower the cycle-by-cycle threshold signal 148 from the value used for normal operations. In one embodiment, if the frequency for triggering a cycle-by-cycle over-current protection exceeds a predetermined threshold within a given period of time, the control signal 146 instructs the cycle-by-cycle threshold generator 140 to lower the cycle-by-cycle threshold signal 148. Then the threshold signal 148 can recover to the value for normal operations after a predetermined delay. For example, the frequency is equal to a ratio of a number of triggering to the give period of time. In another example, the lowered cycle-by-cycle threshold signal 148 varies the input voltage 104.

The control signal 142 is used by the abnormal threshold generator 140 to determine the abnormal threshold signal 152. For example, the control signals 142 can adjust the abnormal threshold signal 152 in order to compensate for variations in the input voltage 104.

The cycle-by-cycle comparator 160 receives the cycle-by-cycle threshold signal 148 and a feedback signal 162. The feedback signal 162 indicates the magnitude of a current that the system 100 intends to regulate. For example, the feedback signal 162 is proportional to an input current of a power converter. In one embodiment, the cycle-by-cycle threshold signal 148 represents a threshold voltage, and the feedback signal 162 includes a voltage. In another embodiment, the cycle-by-cycle threshold signal 148 represents a threshold current, and the feedback signal 162 includes a current. The cycle-by-cycle comparator 160 compares the cycle-by-cycle threshold signal 148 and the feedback signal 162, and generates a comparison signal 164.

The abnormal comparator 170 receives the abnormal threshold signal 152 and the feedback signal 162. In one embodiment, the abnormal comparator 170 includes n abnormal comparator subsystems. Each abnormal comparator subsystem receives the feedback signal 162 and information about magnitude of an abnormal threshold from one of the n abnormal threshold subsystems. n is a positive integer. For example, the abnormal threshold signal 152 represents a threshold voltage, and the feedback signal 162 includes a voltage. As another example, the abnormal threshold signal 152 represents a threshold current, and the feedback signal 162 includes a current. The abnormal comparator 170 compares the abnormal threshold signal 152 and the feedback signal 162, and generates a comparison signal 172. In one embodiment, the abnormal comparator 170 includes n abnormal comparator subsystems. Each abnormal comparator subsystem compares the received abnormal threshold and the feedback signal 162, and generates a component of the comparison signal 172.

The comparison signal 172 is received by the shutdown control system 180. If the comparison signal 172 shows that the feedback signal 162 exceeds the abnormal threshold signal 152, the shutdown control system 180 can generate a shutdown signal 182 after a predetermined delay. In one embodiment, the shutdown control system 180 includes n shutdown control subsystems. n is a positive integer. Each shutdown control subsystem receives a component of the comparison signal 172 from one of the n abnormal comparator subsystems. If the component shows that the feedback signal 162 exceeds the respective abnormal threshold, the shutdown control subsystem can generate the shutdown signal 182 after a predetermined delay. In one embodiment, the predetermined delay can be different or the same between any two shutdown control subsystems. For example, the predetermined delay is shorter for a shutdown control subsystem that corresponds to a higher threshold.

In another embodiment, the shutdown signal 182 generated by one shutdown control subsystem may be different or the same as the shutdown signal 182 generated by another shutdown control subsystem. For example, the shutdown signal 182 specifies the length of a shutdown period when a power converter should remain shutdown. In another example, the shutdown period is longer for the shutdown signal 182 generated by a shutdown control subsystem that corresponds to a higher threshold. In yet another example, the shutdown period indicates a permanent shutdown. As an example, if the highest threshold is exceeded, the shutdown is permanent.

The pattern recognition system 130 receives the comparison signal 164. In one embodiment, the pattern recognition system uses an up-down counter scheme or an analog filter approach. The comparison signal 164 indicates whether the feedback signal 162 exceeds the cycle-by-cycle threshold signal 148. If the feedback signal 162 exceeds the cycle-by-cycle threshold signal 148, the cycle-by-cycle over-current protection is triggered. In one embodiment, if the triggering frequency of the cycle-by-cycle over-current protection exceeds a predetermined threshold within a given period of time, the control signal 146 instructs the cycle-by-cycle threshold generator 140 to lower the cycle-by-cycle threshold signal 148. In another embodiment, the pattern recognition and control is performed repeatedly.

The PWM generator 190 receives the comparison signal 164 and the shutdown signal 182 and generates a modulation signal 196. The modulation signal 196 is used to turn on or off the switch 192. For example, if the comparison signal 164 indicates that the feedback signal 162 exceeds the cycle-by-cycle threshold signal 148, the PWM generator 190 activates the cycle-by-cycle over-current protection and changes the modulation signal 196. The changed modulation signal 196 turns off the switch 192. In another example, if the shutdown signal 182 includes a shutdown command with a shutdown period, the modulation signal 196 is generated to turn off the switch 192. After the shutdown period, the switch 192 is again turned on by the modulation signal 196. For example, the power converter is restarted, and the startup control 120 is activated.

The switch 192 provides certain control over the current that the system 100 intends to regulate. For example, the switch 192 includes a transistor, whose gate is connected to the modulation signal 196. In one embodiment, the transistor is a MOSFET.

The feedback system 194 generates the feedback signal 162. For example, the feedback system 194 includes a current sensing device. The feedback system 194 may or may not convert the sensed current into a voltage. In another example, the feedback signal 162 indicates the magnitude of a current that the system 100 intends to regulate. In one embodiment, the feedback signal 162 represents the magnitude with voltage. In another embodiment, the feedback signal 162 represents the magnitude with current.

As discussed above, in one embodiment, the control signals 142 can adjust the cycle-by-cycle threshold signal 148 in order to compensate for variations in the input voltage 104 during normal operations. The cycle-by-cycle threshold signal 148 is used to regulate an input current of a power converter. The power converter can convert the input voltage into an output voltage associated with an output power of the power converter. The cycle-by-cycle threshold signal 148 corresponds to a threshold input current, and a threshold power level for the output power. The threshold power level is a function of the input voltage 104. For example, the threshold power level remains constant with respect to the input voltage 104. In another example, the threshold power level increases or decreases with the input voltage 104. In yet another example, the threshold power level is used as the maximum output power allowable by the cycle-by-cycle threshold.

Figure 2:
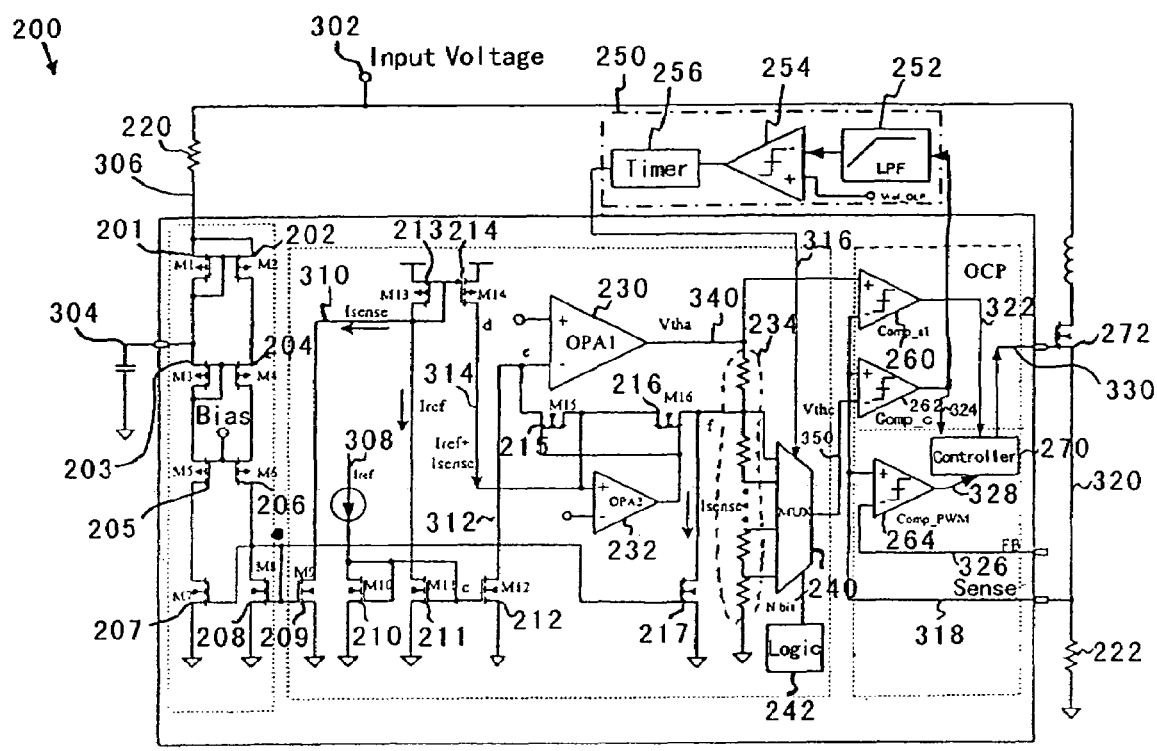
FIG. 2 is a simplified adaptive multi-level threshold system for over-current protection according to another embodiment of the present invention.

FIG. 2 is a simplified adaptive multi-level threshold system for over-current protection according to another embodiment of the present invention. This diagram is merely an example, which should not unduly limit the scope of the claims. One of ordinary skill in the art would recognize many variations, alternatives, and modifications. A system 200 includes transistors 201 through 217, resistors 220 and 222, operations amplifiers 230 and 232, a voltage divider 234, a multiplexer 240, a logic system 242, a pattern recognition system 250, comparators 260, 262 and 264, a controller 270, and a switch 272. Although the above has been shown using a selected group of components for the system 200, there can be many alternatives, modifications, and variations. For example, some of the components may be expanded and/or combined. Other components may be inserted to those noted above. Depending upon the embodiment, the arrangement of components may be interchanged with others replaced. For example, the system 200 is an example of the system 100. Further details of these components are found throughout the present specification and more particularly below.

The transistors 201 through 208 are used to sense an input voltage 302. In one embodiment, the transistors 201 and 202 form a current mirror. For example, the transistors 201 and 202 are PMOS transistors. The drain of the transistor 201 is connected to a supply voltage 304. The sources of the transistors 201 and 202 are both connected to the input voltage 302 through the resistor 220. For example, the resistor 220 has a resistance ranging from several hundred kΩ to several MΩ. Through the resistor 220, a current 306 is distributed between the transistors 201 and 202 based on the sizes of these two transistors. Additionally, the current 306 is proportional to the input voltage 302.

The transistors 203 and 204 form a cascode. In one embodiment, the cascode enhances the output impendence of the current mirror including the transistors 201 and 202, and improves the accuracy of the sensed current. In another embodiment, the transistors 203 and 204 are PMOS transistors. The transistors 205 and 206 form a pair of switches. In one embodiment, the switches are used to provide additional control for sensing the input voltage 302. In another embodiment, the transistors 205 and 206 are PMOS transistors.

The transistors 207 and 208 form a current mirror. In one embodiment, the transistor 207 provides a drain current and a bias to the cascode including the transistors 203 and 204. The transistor 208 sinks and mirrors the sensed current to the transistor 207 and other components such as the transistor 209. The sensed current indicates the magnitude of the input voltage 302. For example, the sensed current is proportional to the input voltage 302. In another embodiment, the transistors 207 and 208 are NMOS transistors.

The transistors 209 through 214 are used for summing currents. In one embodiment, the transistors 209 through 212 are NMOS transistors, and the transistors 213 and 214 are PMOS transistors. In another embodiment, the sensed current is mirrored by the transistor 209. A reference current 308 is fed into the transistor 210 and mirrored by the transistors 211 and 212. A drain current 312 of the transistor 212 is fed into the negative input terminal of the operational amplifier 230. The drain current 312 is equal to the reference current 308. The reference current 308 and a current 310 equal to the sensed current are added up at the drain of the transistor 213. A drain current of the transistor 213 is mirrored by the transistor 214, which outputs a current 314 to the positive input terminal of the operations amplifier 232. The current 314 equals the sum of the reference current 308 and the current 310.

Figure 3:
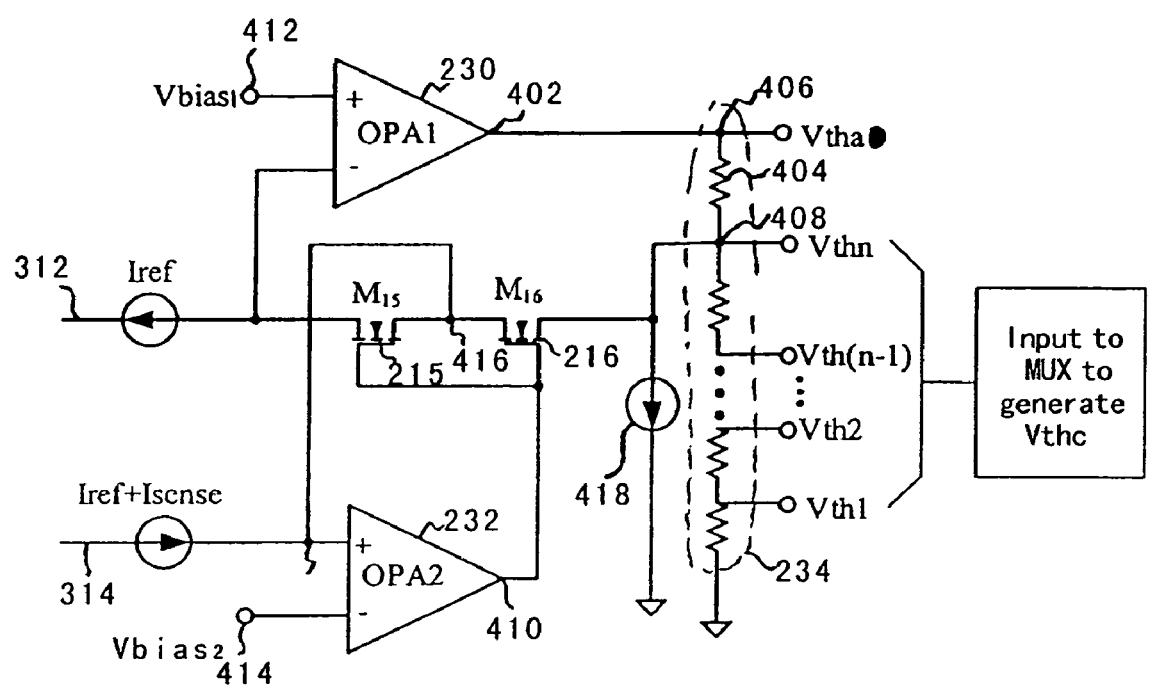
FIG. 3 is a simplified threshold compensation system for over-current protection according to an embodiment of the present invention.

The operational amplifiers 230 and 232, the transistors 215 and 216, and the voltage divider 234 are used to adjust the cycle-by-cycle threshold and the abnormal threshold and compensate for variations in the input voltage 302. FIG. 3 is a simplified threshold compensation system for over-current protection according to an embodiment of the present invention. This diagram is merely an example, which should not unduly limit the scope of the claims. One of ordinary skill in the art would recognize many variations, alternatives, and modifications.

As shown in FIGS. 2 and 3, an output terminal 402 of the operational amplifier 230 is connected to the voltage divider 234. In one embodiment, the voltage divider 234 includes a plurality of resistors in series. For example, the plurality of resistors includes a resistor 404 with two terminals 406 and 408. The terminal 406 is connected to the terminal 402. The terminal 408 is connected to the negative input terminal of the operational amplifier 230 through the transistors 215 and 216. For example, the transistors 215 and 216 are two identical NMOS transistors. The two transistors 215 and 216, the operational amplifier 230, and the resistor 404 form a loop. The drains of the transistors 215 and 216 are connected to the positive input terminal of the operational amplifier 232. The gates of the transistors 215 and 216 are connected to an output terminal 410 of the operational amplifier 232. The operational amplifier 232 and the transistors 215 and 216 form another loop.

The positive input terminal of the operational amplifier 230 and the negative input terminal of the operational amplifier 232 are connected to two reference voltages 412 and 414 respectively. For example, the reference voltage 412 is represented by $V_{bias1}$, and the reference voltage 414 is represented by $V_{bias2}$. A drain terminal 416 of the transistors 215 and 216 has a voltage level substantially equal to $V_{bias2}$, and the negative input terminal of the operational amplifier 230 has a voltage level substantially equal to $V_{bias1}$.

The current 312 is equal to the reference current 308 and flows from the negative input terminal of the operational amplifier 230 and the source of the transistor 215. For example, the magnitude of the current 312 is represented by $I_{ref}$. Additionally, the current 314 is equal to the sum of the reference current 308 and the current 310. For example, the magnitude of the current 310 is represented by $I_{sense}$, and the magnitude of the current 314 is represented by $I_{ref}+I_{sense}$. The current 314 flows to the positive input terminal of the operational amplifier 232 and the drain terminal 416 of the transistors 215 and 216.

When the currents reach balance, the drain currents of the transistors 215 and the 216 are substantially equal to $I_{ref}$ and $I_{sense}$ respectively. A current source 418 is connected to the source of the transistor 216, and used to sink the drain current of the transistor 216. For example, the current source 418 includes the transistor 217.

In one embodiment, if the transistor 215 operates in triode region, the drain current of the transistor 215 can be calculated as follows:

$$I_{d215} = \frac{\mu C_{ox}}{2} \frac{W}{L} [2(V_{gs} - V_t)V_{ds215} - V_{ds215}^2] \quad \text{(Equation 1)}$$

where $I_{d215}$ represents the drain current of the transistor 215. $V_{ds215}$ is the drain voltage with respect to the source voltage for the transistor 215, and $V_{gs}$ is the gate voltage with respect to the source voltage for the transistor 215. $V_t$ is the threshold voltage of the transistor 215. W and L are the width and length of the transistor 215. $\mu$ is the electron mobility of the transistor 215, and $C_{ox}$ is the unit-area capacitance across the gate oxide of the transistor 215.

If $V_{gs}-V_t \gg V_{ds215}$, Equation 1 can be simplified as follows:

$$I_d \approx \frac{W}{L} \mu C_{ox}(V_{gs} - V_t)V_{ds215} \quad \text{(Equation 2)}$$

Therefore, $$V_{ds216} = V_{ds215} \frac{I_{ds216}}{I_{ds215}} = \frac{L \cdot I_{sense}}{W \mu C_{ox}(V_{gs} - V_T)} \quad \text{(Equation 3)}$$

where $I_{d216}$ represents the drain current of the transistor 216, and $V_{ds216}$ represents the drain voltage with respect to the source voltage for the transistor 216. Accordingly, the voltage level at the terminal 408 is determined as follows:

$$V_{terminal} = V_{bias2} - V_{ds216} = V_{bias2} - \frac{L \cdot I_{sense}}{W\mu C_{ox}(V_{gs} - V_T)} \quad \text{(Equation 4)}$$

where $V_{terminal}$ represents the voltage level at the terminal 408. The sensed current $I_{sense}$ indicates the magnitude of the input voltage 302. For example, the sensed current is proportional to the input voltage 302. According to Equation 4, $V_{terminal}$ is adjusted to compensate for variations in the input voltage 302.

In another embodiment, the voltage divider 234 includes n resistors as well as the resistor 404. n is a positive integer. The n resistors provide n voltage levels to the multiplexer 240. For example, the n voltage levels include $V_{thn}$, $V_{th(n-1)}$, . . . , $V_{th2}$, and $V_{th1}$. $V_{thn}$ is equal to $V_{terminal}$.

An abnormal threshold voltage 340 of the system 200 equals the voltage level at the terminal 406. A cycle-by-cycle threshold voltage 350 of the system 200 is generated by the multiplexer 240 controlled by a logic system 242. In one embodiment, the cycle-by-cycle threshold voltage 350 for normal operations is determined based on the n voltage levels according to a predetermined logic. For example, the cycle-by-cycle threshold voltage 350 equals $V_{thn}$ for normal operations. In another embodiment, during the startup of a power converter, the cycle-by-cycle threshold voltage 350 is increased over time. For example, the cycle-by-cycle threshold voltage 350 increases stepwise from $V_{th1}$, $V_{th2}$, . . . , $V_{th(n-1)}$, and $V_{thn}$ according to instructions from the control system 242. In another example, the logic system 242 is used as the startup control system 120.

In yet another embodiment, the cycle-by-cycle threshold voltage 350 is lowered by the multiplexer 240 in response to a signal 316 from the pattern recognition system 250. The pattern recognition detects the triggering frequency of a cycle-by-cycle over-current protection. If the frequency exceeds a predetermined threshold within a given period of time, the signal 316 instructs the multiplexer 240 to lower the cycle-by-cycle threshold voltage 350 according to a pre-determined logic. After a predetermined delay, the cycle-by-cycle threshold voltage 350 can recover to the value for normal operations. For example, the cycle-by-cycle threshold voltage 350 decreases from one of $V_{th1}$, $V_{th2}$, . . . , $V_{th(n-1)}$ and $V_{thn}$, to another of $V_{th1}$, $V_{th2}$, . . . , $V_{th(n-1)}$ and $V_{thn}$ according to instructions from the pattern recognition system 250.

The pattern recognition system 250, for example, includes a low pass filter 252, a comparator 254, and a timer 256. The output signal 316 is used to adaptively adjust the threshold voltage 350.

The cycle-by-cycle threshold voltage 350 and the abnormal threshold voltage 340 are used for triggering an over-current protection. The abnormal threshold voltage 340 is provided to the abnormal comparator 260. The abnormal comparator 260 also receives a sensed voltage 318. The sensed voltage 318 is proportional to a current 320 that the system 200 intends to regulate. For example, the sensed voltage 318 is generated by the resistor 222. The abnormal comparator 260 compares the abnormal threshold voltage 340 and the sensed voltage 318, and generates a comparison signal 322.

The cycle-by-cycle threshold voltage 350 is provided to the cycle-by-cycle comparator 262, which also receives the sensed voltage 318. The cycle-by-cycle comparator 262 compares the cycle-by-cycle threshold voltage 350 and the sensed voltage 318, and generates a comparison signal 324. The comparison signal 324 is sent to both the controller 270 and the pattern recognition system 250.

Additionally, the sensed voltage 318 is provided to the PWM comparator 264, which also receives a feedback (FB) voltage 326 generated by a feedback loop. The PWM comparator 264 compares the feedback voltage 326 and the sensed voltage 318 and generates an output signal 328.

The controller 270 receives the signals 322, 324, and 328, and generates a modulation signal 330. The modulation signal 330 is used to turn on or off the switch 272. For example, the switch 272 includes a transistor. For example, if the signal 322 indicates that the sensed voltage 318 exceeds the cycle-by-cycle threshold voltage 350, the controller 270 activates the cycle-by-cycle over-current protection and changes the modulation signal 330. The changed modulation signal 330 is used to turns off the switch 272. In another example, if the signal 324 indicates that the sensed voltage 318 exceeds the abnormal threshold voltage 340, the modulation signal 330 is generated to turn off the switch 272 either immediately or after a predetermined delay. The shutdown is either permanent or temporary. For example, after a predetermined shutdown period, the switch 272 is again turned on by the modulation signal 330. In yet another example, if the signal 328 indicates that the sensed voltage 318 exceeds the feedback voltage 326, the modulation signal 330 is generated to turn off the switch 272.

As discussed above, in one embodiment, the cycle-by-cycle threshold voltage 350 is compensated for variations in the input voltage 302 during normal operations. The cycle-by-cycle threshold voltage 350 is used to regulate the current 320 of a power converter. The power converter can convert the input voltage 302 into an output voltage associated with an output power of the power converter. The cycle-by-cycle threshold voltage 350 corresponds to a threshold current level for the current 320, and a threshold power level for the output power. The threshold power level is a function of the input voltage 302. For example, the threshold power level remains constant with respect to the input voltage 302. In another example, the threshold power level increases or decreases with the input voltage 302. In yet another example, the threshold power level is used as the maximum output power allowable by the cycle-by-cycle threshold voltage 350. In yet another example, the transistors 208 and 209 form a current mirror. The gain of the current mirror can determine whether the threshold power level is constant, increases, or decreases with respect to the input voltage 302. In one embodiment, the gain of the current mirror is adjusted in order to select whether the threshold power level is constant, increases, or decreases with respect to the input voltage 302.

Figure 4:
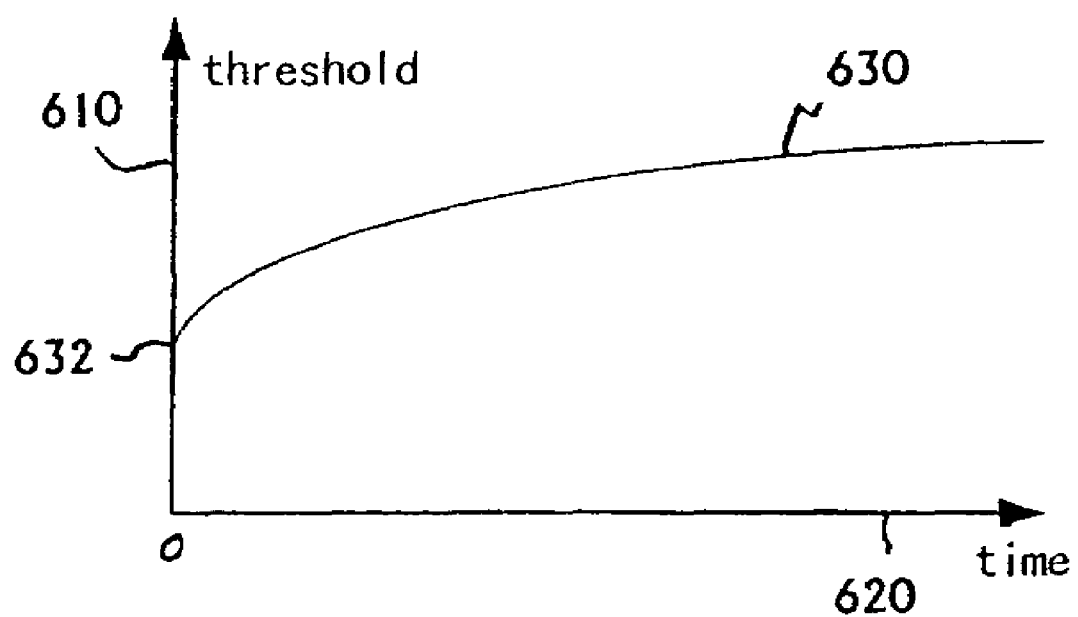
FIG. 4 is a simplified diagram showing cycle-by-cycle threshold as a function of time according to an embodiment of the present invention.

FIG. 4 is a simplified diagram showing cycle-by-cycle threshold as a function of time according to an embodiment of the present invention. This diagram is merely an example, which should not unduly limit the scope of the claims. One of ordinary skill in the art would recognize many variations, alternatives, and modifications. A vertical axis 610 represents cycle-by-cycle threshold voltage or current, and a horizontal axis 620 represents time. A curve 630 shows that the cycle-by-cycle threshold equals to a starting value 632 at the beginning of the startup and then increases over time during the startup. The curve 630 may be produced by the system 100 and/or the system 200.

As discussed above and further emphasized here, FIGS. 1-4 are merely examples, which should not unduly limit the scope of the claims. One of ordinary skill in the art would recognize many variations, alternatives, and modifications.

For example, the cycle-by-cycle threshold generator 140 is replaced by another type of cycle threshold generator. In one embodiment, the cycle threshold generator includes an n-cycle-by-n-cycle threshold generator. n is a positive integer. In another example, the cycle-by-cycle threshold signal 148 is replaced by another type of cycle threshold signal. In one embodiment, the cycle threshold signal includes an n-cycle-by-n-cycle threshold signal. n is a positive integer. In yet another example, the cycle-by-cycle threshold represented by the cycle-by-cycle threshold signal 148 is replaced by another type of cycle threshold. In one embodiment, the cycle threshold includes an n-cycle-by-n-cycle threshold. n is a positive integer. In yet another example, the cycle-by-cycle threshold voltage 350 is replaced by another type of cycle threshold voltage. In one embodiment, the cycle threshold voltage includes an n-cycle-by-n-cycle threshold voltage. n is a positive integer.

According to yet another embodiment of the present invention, a method for protecting a power converter includes receiving an input signal, generating a first control signal based on at least information associated with the input signal, and generating a second control signal indicating whether a power converter is at a startup state. Additionally, the method includes processing information associated with the first control signal, the second control signal, and a third control signal, generating a cycle threshold based on at least information associated with the first control signal, the second control signal, and the third control signal, and processing information associated with the cycle threshold and a feedback signal. Moreover, the method includes generating a comparison signal based on at least information associated with the cycle threshold and the feedback signal, processing information associated with the comparison signal, and generating the third control signal based on at least information associated with the comparison signal. The third control signal indicates whether the feedback signal exceeds the cycle threshold at a frequency higher than a predetermined level. Also, the method includes generating a modulation signal based on at least information associated with the comparison signal, and determining an input current for the power converter based on at least information associated with the modulation signal. For example, the method can be performed by the system 100 and/or the system 200.

According to yet another embodiment of the present invention, a method for protecting a power converter includes receiving an input signal, generating a control signal based on at least information associated with the input signal, and processing information associated with the control signal. Additionally, the method includes generating a threshold based on at least information associated with control signal, processing information associated with the threshold and a feedback signal, and generating a comparison signal based on at least information associated with the threshold and the feedback signal. Moreover, the method includes processing information associated with the comparison signal, and shutting down the power converter based on at least information associated with the comparison signal. The threshold varies with at least the input signal. For example, the method can be performed by the system 100 and/or the system 200.

The present invention has various applications. For example, the system 100 and/or the system 200 can provide an over-current protection (OCP) scheme to a switch-mode power converter with pulse width modulation. For example, the switch-mode power converter is a forward converter or an offline fly-back converter. In another example, the switch-mode power converter operates in discontinuous current mode (DCM) or continuous current mode (CCM).

Figure 5:
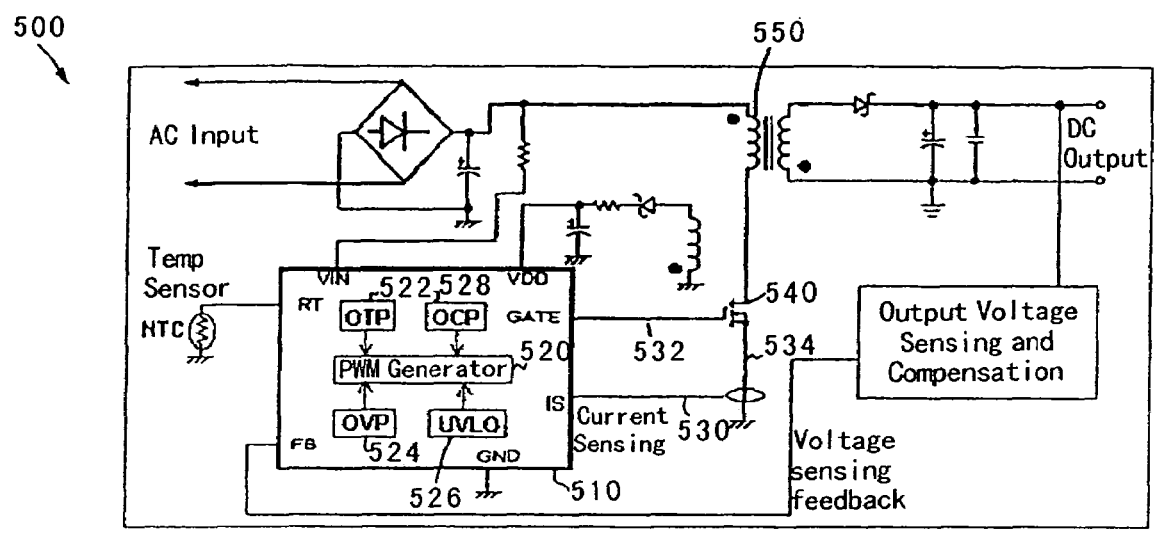
FIG. 5 is a simplified offline flyback converter according to an embodiment of the present invention.

FIG. 5 is a simplified offline flyback converter according to an embodiment of the present invention. This diagram is merely an example, which should not unduly limit the scope of the claims. One of ordinary skill in the art would recognize many variations, alternatives, and modifications. The system 500 includes a PWM controller 510. The PWM controller 510 includes a PWM generator 520 coupled to a plurality of protection systems. The plurality of protection systems includes a system 522 for over-temperature protection (OTP), a system 524 for over-voltage protection (OVP), a system 526 for under-voltage lockout (UVLO), and a system 528 for over-current protection (OCP). For example, the OCP system 528 includes some or all components of the system 100. In another example, the OCP system 528 includes some or all components of the system. The PWM controller 510 receives a sensed signal 530 and outputs a control signal 532. The sensed signal 530 indicates the magnitude of a current 534 in either the voltage domain or the current domain. The control signal 532 is used to turn on or off a switch 540. The switch 540 can control the current flowing through a primary winding 550 of the system 500.

As shown in FIG. 5, the OCP system 528 can limit the current 534 from exceeding a preset value. Without a proper OCP protection scheme, the current 534 can reach a high level when the output short circuit or over loading occurs. This high current can cause damage to the switch 540 due to excessive voltage stress resulting from L×di/dt at switching or thermal run-away at operation. L represents the inductance of the primary winding 550, and i represents the current flowing through the primary winding 550. Additionally, without a proper OCP protection scheme, the rectifier components at the secondary side of the power converter 500 can suffer permanent damage due to excessive voltage and current stress level at switching in the power converter 500. Accordingly, the OCP system 528 according to certain embodiments of the present invention can provide important protection for a reliable switch mode converter design.

The present invention has various advantages. Some embodiments of the present invention provide multi-level thresholds for over-current protection. For example, the multi-level thresholds correspond to different operating conditions. As an example, the operating conditions include output overloading conditions and system startup conditions. In another example, the multi-level thresholds are adaptively adjusted based on input voltage. In yet another example, the multi-level thresholds are in the current domain and/or the voltage domain. Certain embodiments of the present invention provide a cycle-by-cycle threshold that is compensated for variations in input voltage. For example, the maximum output power is adjusted in response to variations in the input voltage. Some embodiments of the present invention provide a cycle-by-cycle threshold for current limiting under normal operations. For example, the maximum output power is set to be constant, increasing or decreasing over a range of input voltage under normal operations depending on the compensation scheme used between over-current threshold level and input voltage.

Certain embodiments of the present invention adjust a cycle-by-cycle threshold in response to a triggering pattern of an over-current protection. The triggering pattern reflects the output loading conditions. For example, if the triggering count is low and random within a given period of time, the output loading condition is usually normal. The cycle-by-cycle threshold for normal operations can be used. In another example, if the triggering count exceeds a predetermined level within a given period of time, the cycle-by-cycle threshold is reduced. In yet another example, the maximum output power is reduced under short-circuit or heavy-overloading conditions until the output loading condition becomes normal. In yet another example, the power converter operates in CCM or DCM. Some embodiments of the present invention adjust a cycle-by-cycle threshold to control the current increase during system startup. For example, during the startup, the cycle-by-cycle threshold is ramped from a low value to the normal value used for normal operations. Certain embodiments of the present invention distinguish the over-current protection for start-up conditions and the over-current protection for normal operations. During the power supply startup, the output voltage of a power converter is usually lower than the output voltage for normal operations. The feedback loop can force the power converter to deliver additional current and thus power to the output. Consequently, the transformer winding current can quickly rise to a very high level. This rapid current rise often causes transient saturation of the winding and damages the converter system due to double magnetic flux effect. According to certain embodiments of the present invention, the over-current threshold is ramped up during start up in order to avoid or reduce the transient saturation and double magnetic flux effect. Hence the system damage can be reduced or prevented.

Certain embodiments of the present invention provide an abnormal threshold. For example, the abnormal threshold is higher than, equal to, or lower than the cycle-by-cycle threshold. In another example, the abnormal threshold is used for triggering a system shutdown in short-circuit and/or over-loading conditions. Some embodiments of the present invention provide a self recovery mechanism after a predetermined shutdown period. For example, a power converter can operate in the "burst mode" to reduce the output power under abnormally high over-current conditions and recover to normal operations once the abnormally high over-current conditions are cleared. Certain embodiments of the present invention provide an immediate and permanent latch shutdown if the highest over-current threshold is triggered in order to effectively protect the converter system from damage in a timely manner. Some embodiments of the present invention provide a solution for both current limiting and system shutdown. Certain embodiments of the present invention can shorten the OCP de-bouncing and/or delay and overcome the over-current hole problem. Some embodiments of the present invention can improve system flexibility, reliability and safety. Certain embodiments of the present invention can decouple a complicated OCP design into a simple set of protection mechanisms.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for protecting a power converter, the system comprising:
an input component configured to receive an input signal and generate a first signal;
a threshold generator configured to receive the first signal and generate a threshold signal;
a processing component configured to receive the threshold signal and a feedback signal and generate a second signal based on at least information associated with the threshold signal and the feedback signal;
a pulse-width-modulation generator configured to receive the second signal and generate a modulation signal in response to the second signal;
a switch configured to receive the modulation signal and affect an input current for a power converter;
wherein:
the input current is associated with an output power for the power converter;
the threshold signal represents a threshold level for the output power;
the threshold level is constant, decreases, or increases with respect to a magnitude related to the input signal.

2. The system of claim 1 wherein:
the input signal is proportional to an input voltage;
the power converter is configured to convert the input voltage to an output voltage;
the output voltage is associated with the output power.

3. The system of claim 2 wherein the threshold level is constant with the input voltage.

4. The system of claim 2 wherein the threshold level decreases with the input voltage.

5. The system of claim 2 wherein the threshold level increases with the input voltage.

6. The system of claim 2 wherein:
the feedback signal is proportional to the input current;
the power converter is configured to convert the input voltage to an output voltage;
the output voltage is associated with the output power.

7. The system of claim 1 wherein the threshold signal represents at least one selected from a group consisting of a threshold voltage or a threshold current.

8. A system for protecting a power converter, the system comprising:
a startup component configured to generate a first signal;
a threshold generator configured to receive the first signal and generate a threshold signal representing a threshold;
a processing component configured to receive the threshold signal and a feedback signal and generate a second signal;
a pulse-width-modulation generator configured to receive the second signal and generate a modulation signal in response to the second signal;
a switch configured to receive the modulation signal and affect an input current for a power converter;
wherein the threshold increases with a time during a startup period.

9. The system of claim 8, and further comprising:
an input component configured to receive an input signal and generate a third signal;
wherein the threshold generator is further configured to receive the third signal and generate the threshold based on at least the first signal and the third signal.

10. The system of claim 8 wherein the feedback signal is proportional to the input current.

11. The system of claim 8 wherein the threshold generator comprises a multiplexer configured to receive a plurality of threshold levels and the first signal and generate the threshold based on at least information associated with the plurality of threshold levels and the first signal.

12. The system of claim 11 wherein:
the multiplexer is further configured to select a first threshold level from the plurality of threshold levels at a first time and a second threshold level from the plurality of threshold levels at a second time;
the second time is later than the first time;
the second threshold level is higher than the first threshold level.

13. A system for protecting a power converter, the system comprising:
a threshold generator configured to generate a threshold signal representing a threshold;
a first processing component configured to receive the threshold signal and a feedback signal and generate a first signal;
a pulse-width-modulation generator configured to receive the first signal and generate a modulation signal in response to the first signal;
a switch configured to receive the modulation signal and affect an input current for a power converter;
a second processing component configured to receive the first signal and output a second signal to the threshold generator;
wherein:
the second signal indicates whether a relationship between the feedback signal and the threshold signal satisfies one or more predetermined criteria;
the threshold generator is further configured to adjust the threshold from a first threshold level to a second threshold level if the second control signal indicates the relationship between the feedback signal and the threshold signal satisfies the one or more predetermined criteria.

14. The system of claim 13, and further comprising:
an input system configured to receive an input signal and generate a third signal;
wherein:
the threshold generator is further configured to receive the third control signal and generate the threshold signal based on at least the second signal and the third signal;
the threshold varies with at least the input signal.

15. The system of claim 13 wherein the feedback signal is proportional to the input current.

16. The system of claim 13 wherein the threshold generator is further configured to change the threshold from the second threshold level to a third threshold level after a predetermined period of time.

17. The system of claim 16 wherein the third threshold level is equal to the first threshold level.

18. A method for protecting a power converter, the method comprising:
receiving an input signal;
generating a first signal based on at least information associated with the input signal;
generating a second signal indicating whether a power converter is at a startup state;
processing information associated with the first signal, the second signal, and a third signal;
generating a threshold signal based on at least information associated with the first signal, the second signal, and the third signal, the threshold signal representing a threshold;
processing information associated with the threshold signal and a feedback signal;
generating a fourth signal based on at least information associated with the threshold signal and the feedback signal;
processing information associated with the fourth signal;
generating the third signal based on at least information associated with the fourth signal, the third signal indicating whether a relationship between the feedback signal and the threshold signal satisfies one or more predetermined criteria;
generating a modulation signal based on at least information associated with the fourth signal;
determining an input current for the power converter based on at least information associated with the modulation signal.

19. The method of claim 18 wherein:
the input current is associated with an output power for the power converter;
the threshold signal represents a threshold level for the output power;
the threshold level is constant, decreases, or increases with respect to a magnitude related to the input signal.

20. The method of claim 18 wherein the generating a threshold signal comprises increasing the threshold with a time during a startup period if the second signal indicates the power converter is at the startup state.

21. The method of claim 19 wherein the generating a threshold signal comprises reducing the threshold from a first threshold level to a second threshold level if the third signal indicates the relationship between the feedback signal and the threshold signal satisfies the one or more predetermined criteria.

* * * * *